(12) United States Patent
Du et al.

(10) Patent No.: US 12,418,513 B2
(45) Date of Patent: Sep. 16, 2025

(54) INTERNET PROTOCOL BASED SECURITY OVER PORT FORWARDING TUNNELS

(71) Applicant: Rubrik, Inc., Palo Alto, CA (US)

(72) Inventors: Fan Du, Santa Clara, CA (US);
Jiangbin Luo, Cupertino, CA (US);
Pradeep Bansal, Portland, OR (US);
Keon Jang, Los Altos, CA (US)

(73) Assignee: Rubrik, Inc., Palo Alto, CA (US)

( * ) Notice: Subject to any disclaimer, the term of this patent is extended or adjusted under 35 U.S.C. 154(b) by 589 days.

(21) Appl. No.: 17/855,764

(22) Filed: Jun. 30, 2022

(65) Prior Publication Data

US 2024/0007441 A1 Jan. 4, 2024

(51) Int. Cl.
*H04L 9/40* (2022.01)
(52) U.S. Cl.
CPC ........ *H04L 63/029* (2013.01); *H04L 63/0236* (2013.01); *H04L 63/20* (2013.01)
(58) Field of Classification Search
CPC ... H04L 63/029; H04L 63/0236; H04L 63/20; H04L 9/40
See application file for complete search history.

(56) References Cited

U.S. PATENT DOCUMENTS

| | | | |
|---|---|---|---|
| 9,143,480 B2* | 9/2015 | Brousseau | H04L 67/141 |
| 9,172,559 B2* | 10/2015 | Chen | H04L 12/4641 |
| 10,375,025 B2* | 8/2019 | Zheng | H04L 63/166 |
| 2002/0138628 A1* | 9/2002 | Tingley | H04L 61/00 709/227 |
| 2014/0181248 A1* | 6/2014 | Deutsch | H04L 61/5076 709/217 |
| 2017/0223154 A1* | 8/2017 | Hammam | H04L 45/60 |
| 2018/0124198 A1* | 5/2018 | Petrov | H04L 12/4633 |
| 2020/0213151 A1* | 7/2020 | Srivatsan | H04L 9/0643 |
| 2023/0283608 A1* | 9/2023 | Bosch | H04L 63/102 726/4 |

FOREIGN PATENT DOCUMENTS

| | | | | |
|---|---|---|---|---|
| JP | 2004007671 A | * | 1/2004 | ......... H04L 12/4633 |
| WO | WO-02061599 A1 | * | 8/2002 | ....... H04L 29/12009 |
| WO | WO-2009055722 A1 | * | 4/2009 | ....... H04L 29/12367 |

* cited by examiner

*Primary Examiner* — Jayesh M Jhaveri
(74) *Attorney, Agent, or Firm* — Holland & Hart LLP

(57) ABSTRACT

An application server host may receive, via a port forwarding tunnel, a connection request that includes an indication of a client internet protocol (IP) address for a client host. The application server host may identify based at least in part on the client IP address and using a mapping maintained for a plurality of client hosts, a virtual IP address that is associated with the client IP address and a client network identifier associated with the port forwarding tunnel from which the connection request is received. The application server host may open a connection between an application server hosted by the application server host and the client host using the identified virtual IP address.

20 Claims, 12 Drawing Sheets

INTERNET PROTOCOL BASED SECURITY OVER PORT FORWARDING TUNNELS

FIELD OF TECHNOLOGY

The present disclosure relates generally to database systems and data processing, and more specifically to internet protocol based security over port forwarding tunnels.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Access to various computing resources, such as an application server, may be protected using security measures. For example, some application servers enforce security policies based on client internet protocol (IP) addresses, as the client IP address is generally coupled to a client identity. However, some services provide secure access to remote clients using port forwarding tunnels, which may replace the client IP address (of a packet) with the IP address of the port forwarding tunnel. In such cases, IP addresses of the client may not be used to provide secure access. Additionally, as some services may support multitenancy and client IP addresses across tenants may be the same, it may be difficult to differentiate between clients to enforce security policies.

Implementations described herein support secure access using client IP addresses and port forwarding tunnel connection techniques. When a new client is added to the system, the client is assigned a unique virtual IP address that is maintained on the application server host in a mapping (e.g., file or database). The unique virtual IP address is associated with a client network name and a client host IP address in the mapping. When a connection request is received at the application server host, the application server host identifies a corresponding virtual IP address and opens the connection using the identified virtual IP address. The virtual IP address may then be used by the application server to enforce security policies.

Aspects of the disclosure are initially described in the context of an environment supporting data management. Aspects of the disclosure are further described with respect to computing environments illustrating resource connections using port forwarding tunnels and a process flow diagram illustrating IP based security over port forwarding tunnels. Aspects of the disclosure are further illustrated by and described with reference to apparatus diagrams, system diagrams, and flowcharts that relate to IP based security over port forwarding tunnels.

Figure 1:
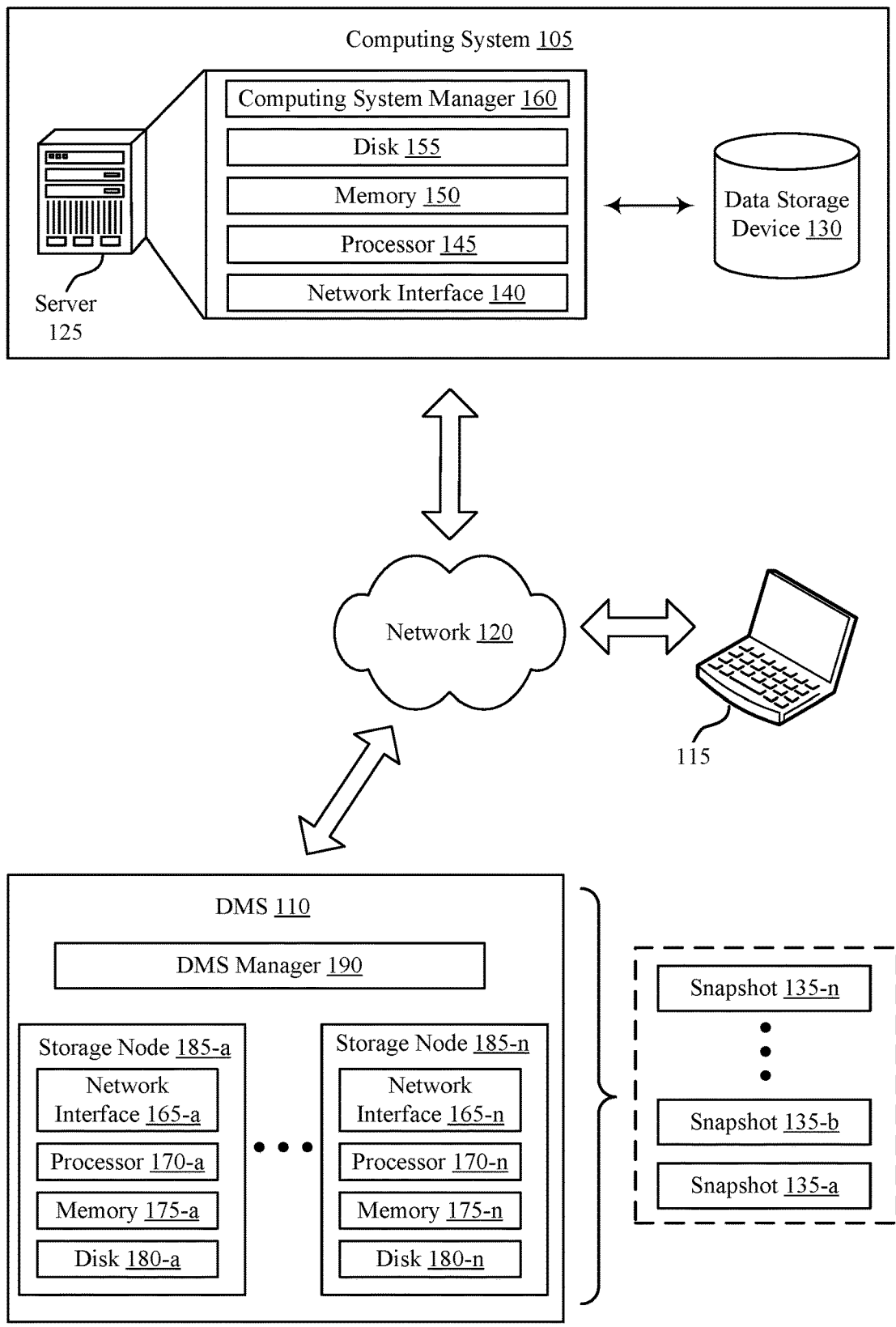
FIG. 1 illustrates an example of a data management system that supports internet protocol based security over port forwarding tunnels in accordance with aspects of the present disclosure.

FIG. 1 illustrates an example of a computing environment 100 supports IP based security over port forwarding tunnels in accordance with various aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

As described herein, the server 125 may run or host various applications (e.g., via one or more virtual machines), such as an application server, a database server or, a webserver. In some examples, a client system, such as computing device 115 or the DMS 110, may access resources of the computing system 105 and the server 125 or may store client data to the resources of the computing system 105. Similarly, the DMS 110 may function as a server that is accessible by client systems, such as the computing device 115 or the computing system 105. As such, computing system 105, DMS 110, or another system (e.g., a cloud computing resource) may function as a server that supports access to resources and data by client hosts.

In some examples, a client system may access resources of a server over tunnels. In one example, a port forwarding tunnel technique, such as secure shell protocol (SSH) and secure socket funneling (SSF) may be used to provide secure access to remote clients to resources of a server. Via a tunnel, the client systems may access remote resources and services, such as file access, database access, among others. Many services, such as network file system (NFS) and server message block (SMB) may enforce security policies based on a source IP address of the client. Thus, if the client IP address is not authorized, then access to services and data may be denied. The client IP address may be used to enforce security policies because a client IP address may be tightly coupled with the client identity, and the application services may obtain IP addresses when service request packets are received.

However, port forwarding tunnel access techniques may replace the IP address of the client system in a packet with an IP address associated with the port forwarding tunnel server. Thus, the information associated with the client (e.g., the client IP address) may be lost, and security policies that rely on a client IP address may not be enforceable or useful. Various techniques may be used to address the described shortcomings of port forwarding tunnels, such as dropping of IP based security requirements or allowing all connections through port forwarding tunnels, but these techniques may result in increased security risks. Another solution is the use of an VPN solution that is complex, as the VPN solution may require an IP-encapsulation VPN (clients and server), a gateway, a reserved IP range as client VPN IP addresses, and related routes. Further, the VPN solutions may not address a problem of overlapping IP addresses. Overlapping IP may mean that the same IP address may be used by multiple clients, which may occur when multiple administrative domains issue IP addresses from similar ranges, especially from private IP address blocks. As such, a server (e.g., an application service) may not be able to differentiate clients based only on IP addresses, which may result in failure of client IP address based security policies.

Techniques described herein support secure access to services via port forwarding tunneling techniques and using client IP based security policies. Specifically, an application server host may support virtual IP management and lookup. When a new client is provisioned for access to the server, the client is assigned a virtual IP address (e.g., a loopback IP address) that is maintained in a mapping that supports virtual IP address lookup using a client IP address and a client network identifier. The virtual IP is used to enforce security policies by the application server. A client may request access using a tunnel endpoint (e.g., a remote service server), and during connection setup, the virtual IP lookup is performed using the client IP address and the client network identifier (associated with the tunnel). From a tunnel service, the end service (e.g., application server) is connected using the corresponding virtual IP address. Thus, using these techniques, services provided by the computing system 105 (e.g., the server 125), the DMS 110, or both may be secured using client IP addresses and using port forwarding tunnel techniques to support secure access by client systems (e.g., computing devices 115).

It should be appreciated by a person skilled in the art that one or more aspects of the disclosure may be implemented in the communicating environment 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
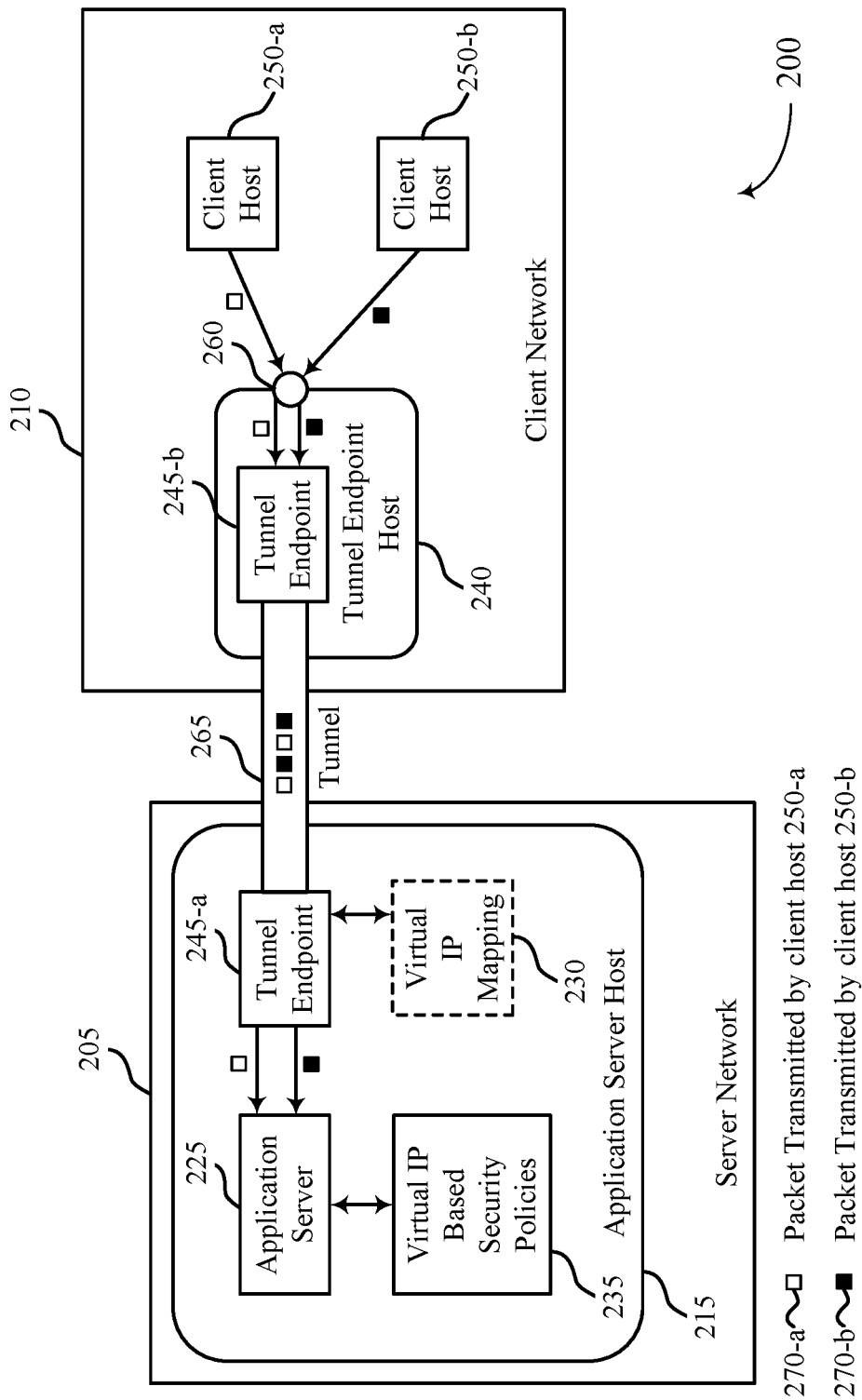
FIG. 2 illustrates an example of a computing environment that supports internet protocol based security over port forwarding tunnels in accordance with aspects of the present disclosure.

FIG. 2 illustrates an example of a computing environment 200 that supports IP based security over port forwarding tunnels in accordance with aspects of the present disclosure. The computing environment includes a server network 205 and a client network 210. The computing environment 200 may implement or may be implemented by aspects of computing environment 100 of FIG. 1. The server network 205 may support various computing devices that run host environments, such as application server host 215, which may be an example of a virtual machine as described with respect to FIG. 1. The application server host 215 may support various services, such as an application server 225. In some examples, the application server host 215 or the application server 225 is an example of DMS 110 of FIG. 1 and supports access to services by a client system, such as computing device 115 of FIG. 1

The client network 210 may be an example of a local area network (LAN), virtual private network (VPN), or the like, that supports various services and clients, such as client hosts 250. Each client host 250 may be associated with a client IP address. The client hosts 250 may access services of the application server 225 at a separate network using a port forwarding tunnel 265, which may be implemented using SSH and SSF techniques, for example.

Before a client host accesses services by the application server 225, the client host 250 is provisioned with a virtual IP address at the application server host 215. The application server host 215 may be configured with a range of virtual IP addresses from which to assign a virtual IP address to a client host 250 during client provisioning. In some examples, the range of virtual IP addresses includes a range of loopback IP addresses. The virtual IP address may not overlap with network addresses that are accessible via the application server host 215. Loopback IP address blocks are defined in both IPv4 and IPv6, may be supported by most operating systems, and may be looped through a network interface card locally (e.g., the network interface 165 of FIG. 1). Depending on a size of a deployment and a number of potential client hosts 250, a portion of the subnet of loopback IP addresses may be configured for assignment to hosts. When one client network (e.g., client network 210) is accessing the application server host 215, an entire or a portion of a subnet may be available for client hosts of the client network (e.g., client hosts 250 of client network 210) the application server host 215, each client network may be assigned a respective block of virtual IP addresses. For example, the client network 210 may be allocated the block 127.128.1.0/24, and virtual IP addresses of the client hosts 250 may be 127.128.1.1 and 127.12.1.2.

When the client host 250 is provisioned, the application server host 215 may store an association of the IP address of the client host 250, an identifier of the client network 210 (e.g., a client network name), and the newly assigned virtual IP address in the virtual IP mapping 230. The virtual IP mapping 230 may be an example of a configuration file that is accessed by the application server host 215, and the lines of the file may have the following format, but it should be understood that other formats are contemplated within the scope of the present disclosure:

client network name 1, HostIP 1, Virtual IP 1
client network name 2, HostIP 2, Virtual IP 2

This technique may be applicable when the deployment is relatively static (e.g., infrequent client host additions or deletions). When there are frequent host additions/deletions a virtual IP manager may be more suitable. In this implementation, a dedicated process may be created, and the dedicated process may listen to a TCP port. The TCP port may be used by the application server host 215 for client host registration and deregistration. In such cases, the virtual IP mapping 230 may be maintained in a database.

After a client host 250 is provisioned, the client host 250 may access the application server 225 via the tunnel 265. For example, the client host 250-*a* transmits a connection request to the application server host 215 via the port forwarding tunnel 265. The connection request may include an indication of the client IP address for the client host 250-*a*. In response to receiving the request, the application server host 215 may look up or identify a virtual IP address associated with the client host 250-*a* using the client IP address and the client network name that is associated with the port forwarding tunnel 265 from which the request is received. The virtual IP address identification may be performed based on the implementation of the virtual IP mapping 230. If the virtual IP mapping 230 is a lookup file, then the application server host 215 may access the file. If the virtual IP mapping 230 is implemented as a virtual IP manager, a lookup API request is transmitted by the application server host 215, and a response to the API request may include an indication of the virtual IP address. The API request may include an indication of the client IP address and the client network identifier.

Before the client host 250 is able to access the application server 225, the tunnel 265 is to be deployed for connection between the client network 210 and the server network 205. A tunnel endpoint 245-*a* may be configured at the client hosts 250. The tunnel endpoint 245-*a* may be hosted by a tunnel endpoint host 240. Further, a tunnel endpoint 245-*a* may be a configured application server host 215 that hosts the application server 225 and tunnel forwarding rules may be provisioned to support client hosts 250 connecting to the application server 225. The client hosts 250 are configured to use the IP address of the client tunnel endpoint 245-*b* (e.g., an IP address of port 260) to connect to the remote application server 225. In some examples, the client hosts 250 are configured with the IP addresses using configuration files. As described herein, virtual IP addresses are allocated for the client hosts 250, and the client host real IP address to virtual IP address mapping is saved as a configuration file on the application server host 215 or using a dedicated resolving server. On the application server host 215, the client IP security is provisioned based on the corresponding virtual IPs. For example, for NFS, clients in the source IP block 127.128.1.0/24 may be permitted to read and write files in directory x/y/z.

After the tunnel endpoints 245 and client hosts 250 are configured, the client side tunnel endpoint 245-*b* (e.g., tunnel client) listens on the tunnel forwarding port configured for the remote application service. In some examples, the port may be the same as the listening port on the application server 225. Client hosts 250 may transmit requests to the tunnel 265 at the client side using the port at which the tunnel endpoint 245-*b* is listening. One tunnel endpoint 245-*b* may support connection of multiple client hosts concurrently. As illustrated, both client hosts 250-*a* and 250-*b* are connected at the same time.

For each client session towards the application server 225, the tunnel client (e.g., tunnel endpoint 245-*b*), forms a new connection to the tunnel endpoint 245-*a* at the remote server (e.g., tunnel server). In the process, tunnel client (e.g., the tunnel endpoint 245-*b*) may inform the tunnel server (e.g., the tunnel endpoint 245-*a*) of the virtual IP address of the client host 250. This information is known by the tunnel client because the client host 250 may connect to the tunnel client directly. For each client session, the tunnel server (e.g., the tunnel endpoint 245-*a*) may perform a lookup to resolve the corresponding virtual IP of the client host 250. For each session, the tunnel server may open a new socket, perform a socket bind using the identified virtual IP address of the client host, and initiate a connection to the application server 225 at the link local IP (e.g., 127.0.0.1 or the equivalent in IPv6). The application server 225 may see that the client connection is from a virtual IP (e.g., a loopback IP) and performs security checks based on the virtual IP. Based on the security policy, the service connection request is allowed or denied.

As illustrated in FIG. 2, the connection request and/or other communications may be in the form of packets 270 (e.g., service packet for the connection requests). Communications from the client host 250-*a* may be in the form of packets 270-*a*, and communications from the client host 250-*b* may be in the form of packets 270-*b*. A packet transmitted by a client host 250 may initially include the IP address of the client host 250, but the IP address may be replaced by a source IP address of the port forwarding tunnel 265. The tunnel endpoint 245-*a*, upon receiving the packet with the source IP address, may identify the virtual IP address corresponding to the client host 250 (e.g., based on the client IP address received from the tunnel endpoint 245-) and the identifier for the client network 210. The tunnel endpoint 245-*a* may replace the source IP address of the packet with the identified virtual IP address for the client host and forward the packet to the application server 225. As such, the application server 225 (or the application server host 215) may enforce security policies 235 based on the IP address that is included in the received packets.

Figure 3:
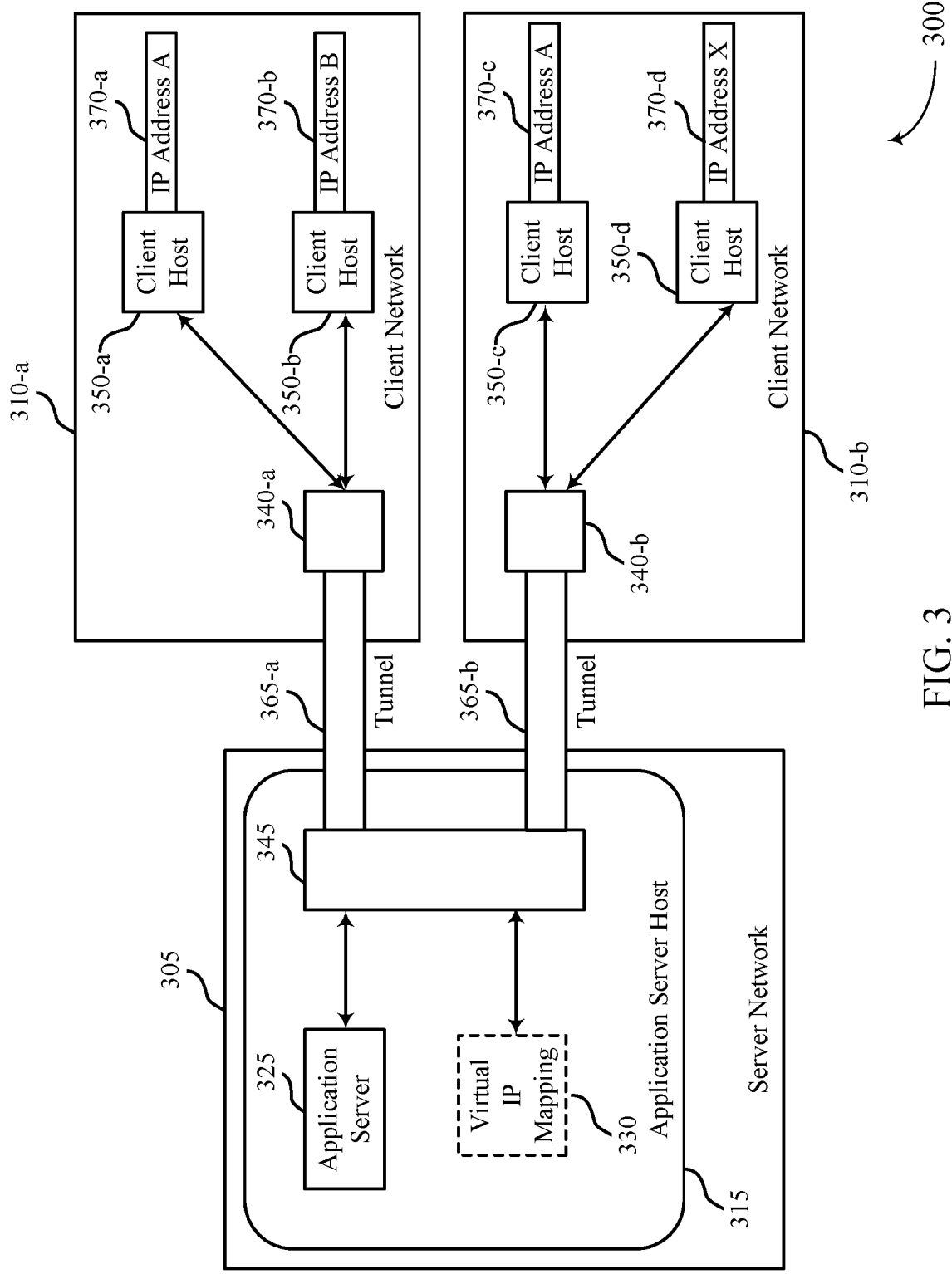
FIG. 3 illustrates an example of a computing environment for multiple client networks that supports internet protocol based security over port forwarding tunnels in accordance with aspects of the present disclosure.

FIG. 3 illustrates an example of a computing environment 300 for multiple client networks that supports IP based security over port forwarding tunnels in accordance with aspects of the present disclosure. The computing environment 300 may implement aspects of computing environment 100 of FIG. 1 and computing environment 200 of FIG. 2. For example, the computing environment 300 includes a server network 305, which may be an example of server network 205 of FIG. 2. The computing environment 300 also includes client networks 310, which may be examples of client network 210 of FIG. 2. The server network 305 includes an application server host 315, which maintains a virtual IP mapping 330 that is used to support secure access to an application server 325 by client hosts 350 via port forwarding tunnels 365.

As illustrated in FIG. 3, client hosts 350 of two different client networks 310-*a* and 310-*b* may be configured to access the application server 325 via respective port forwarding tunnels 365-*a* and 365-*b*. Each client network 310 may correspond to a different organization, team, location, or the like. Each client host 350 may be associated with a respective client IP address 370. The techniques described herein support security policy enforcement for access to the application server 325 when multiple client hosts 350 have overlapping IP addresses. Overlapping IP addresses means the same IP address may be used by multiple clients. This may occur when there are multiple administrative domains (e.g., client networks 310), each issuing IPs from similar ranges (e.g., especially from private IP address blocks). It is possible that these domains may share the same application service (e.g., application server 325). Techniques described herein support policy enforcement when client hosts share a same IP address 370.

As illustrated in FIG. 3, client host 350-*a* of client network 310-*a* has a IP address 370-*a* "IP address A." Client host 350-*c* of client network 310-*b* has an IP address 370-*c*

"IP address A." As such, the IP address 370-*a* and the IP address 370-*c* are the same. Using the techniques described herein, the application server 325 is able to implement IP based security policies while being able to differentiate between the client hosts 350-*a* and client host 350-*c*. Each of the client hosts 350 is assigned a respective virtual IP address by the application server host 315, and the application server hosts 315 maintains the virtual IP mapping 330.

When a client host 350 connects to the application server 325 via the tunnel, the application server host 315 identifies the virtual IP address that is assigned to the client host 350 using the virtual IP mapping 330. The application server host 315 may identify the virtual IP address using the respective client IP address 370 and a client network identifier corresponding to the client network 310 in which the client host 350 operates. Thus, when two client IP addresses are the same (e.g., client IP address 370-*a* and client IP address 370-*c*), the application server host 315 uses the corresponding client network name to differentiate between the client hosts 350 and the client IP addresses 370-*c*. In some examples, the client network name may be determined based on the tunnel 365 via which a connection request is received. For example, as the client host 350-*a* sends a connection request via the tunnel endpoint 340-*a* and the tunnel 365-*a*, the application server host 315 (e.g., a tunnel endpoint 345) is able to identify the corresponding client network name of the client network 310-*a* based on the use of the tunnel 365-*a* that is used to transmit the connection request. Similarly, as the client host 350-*c* sends a connection request via the tunnel endpoint 340-*b* and the tunnel 365-*b*, the application server host 315 (e.g., a tunnel endpoint 345) is able to identify the corresponding client network name of the client network 310-*b* based on the use of the tunnel 365-*b* that is used to transmit the connection request. As such, techniques described herein support security policies for application servers 325 using port forwarding tunnels 365 when client hosts 350 of different domains (e.g., client networks 310) may share overlapping IP addresses.

Figure 4:
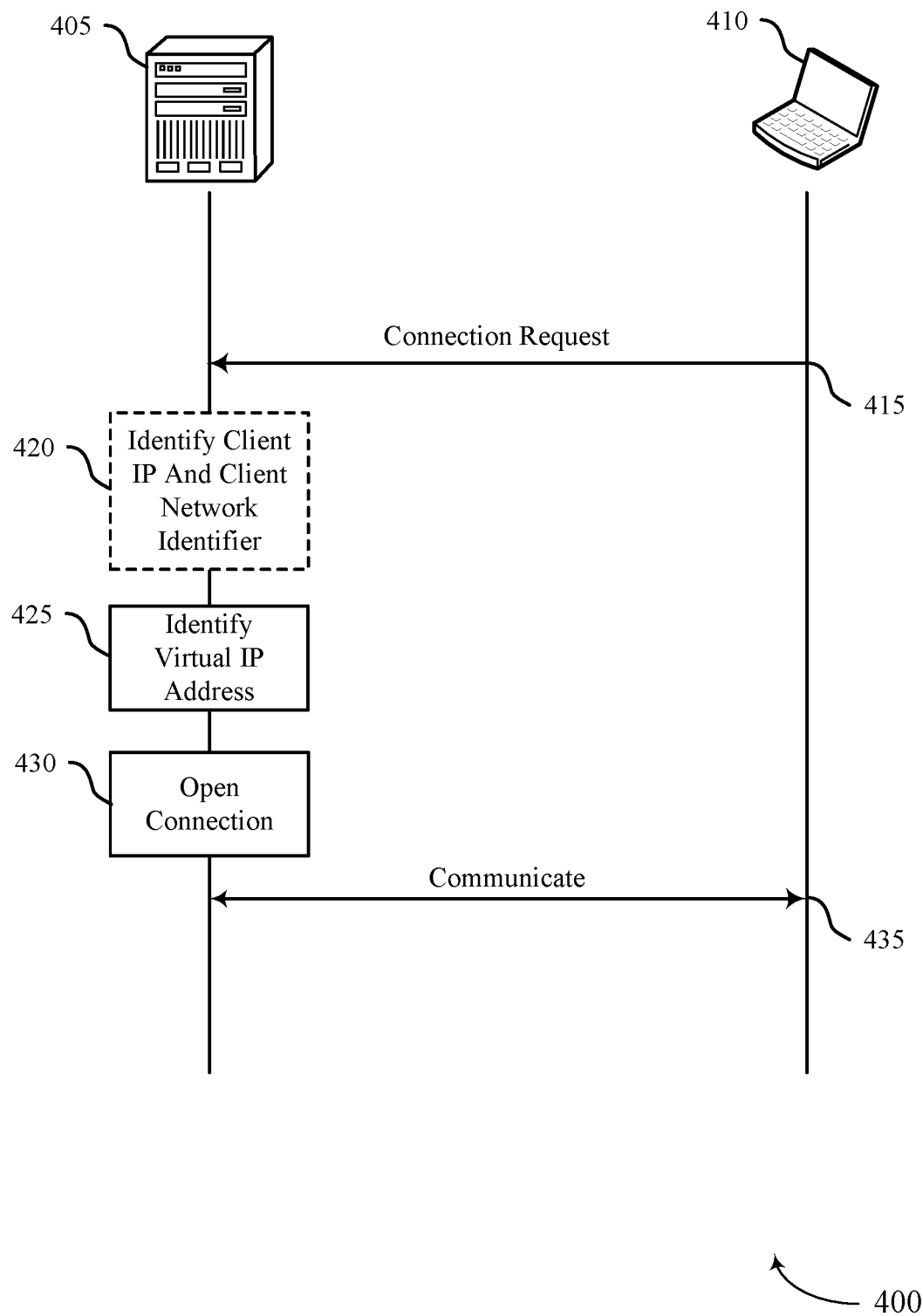
FIG. 4 illustrates an example of a process flow that supports internet protocol based security over port forwarding tunnels in accordance with aspects of the present disclosure.

FIG. 4 illustrates an example of a process flow 400 that supports IP based security over port forwarding tunnels in accordance with aspects of the present disclosure. The process flow 400 includes an application server host 405 and a client host 410, which may be examples of the corresponding devices described with respect to FIGS. 1 through 3. In some examples, some signaling or procedure of the process flow 400 may occur in different orders than shown. Additionally, or alternatively, some additional procedures of signaling may occur, or some signaling or procedures may not occur.

At 415, the application server host 405 may receive, via a port forwarding tunnel, a connection request that includes an indication of a client IP address for the client host 410. The connection request may be in the form of one or more service request packets that include an IP address associated with the port forwarding tunnel. In such cases, a tunneling endpoint (e.g., a tunnel client) may inform the application server host 405 (e.g., a tunnel server) of the client IP address associated with the client host 410 that transmitted the request).

At 420, the application server host 405 (e.g., a tunnel server) may identify a client IP address associated with the client host 410 and a client network identifier associated with the client host 410. The client network identifier may be identified based on the port forwarding tunnel via which the request is received. As such, the tunnel server may identify the client network identifier.

At 425, the application server host 405 (e.g., a tunnel server) may identify, based at least in part on the client IP address and using a mapping maintained for a plurality of client hosts, a virtual IP address that is associated with the client IP address and a client network identifier associated with the port forwarding tunnel from which the connection request is received. In some examples, the application server host 405 may identify the virtual IP address by identifying the virtual IP address from a file including the mapping and maintained at the application server host. Additionally, or alternatively, the application server host 405 may transmit, via an API, a request for the virtual IP address, wherein the request includes the client IP address and the client network identifier and receive, in response to the request, an indication of the virtual IP address.

At 430, the application server host 405 may open a connection between an application server hosted by the application server host 405 and the client host 410 using the identified virtual IP address. In some examples, the application server host 405 (e.g., a tunnel server) may replace a source IP address (in the packet) associated with the port forwarding tunnel with the virtual IP address associated with the client host 410 and forward the packet to the application server hosted by the application server host 405.

At 435, the application server of the application server host 405 and the client host 410 may communicate via the opened connection.

Figure 5:
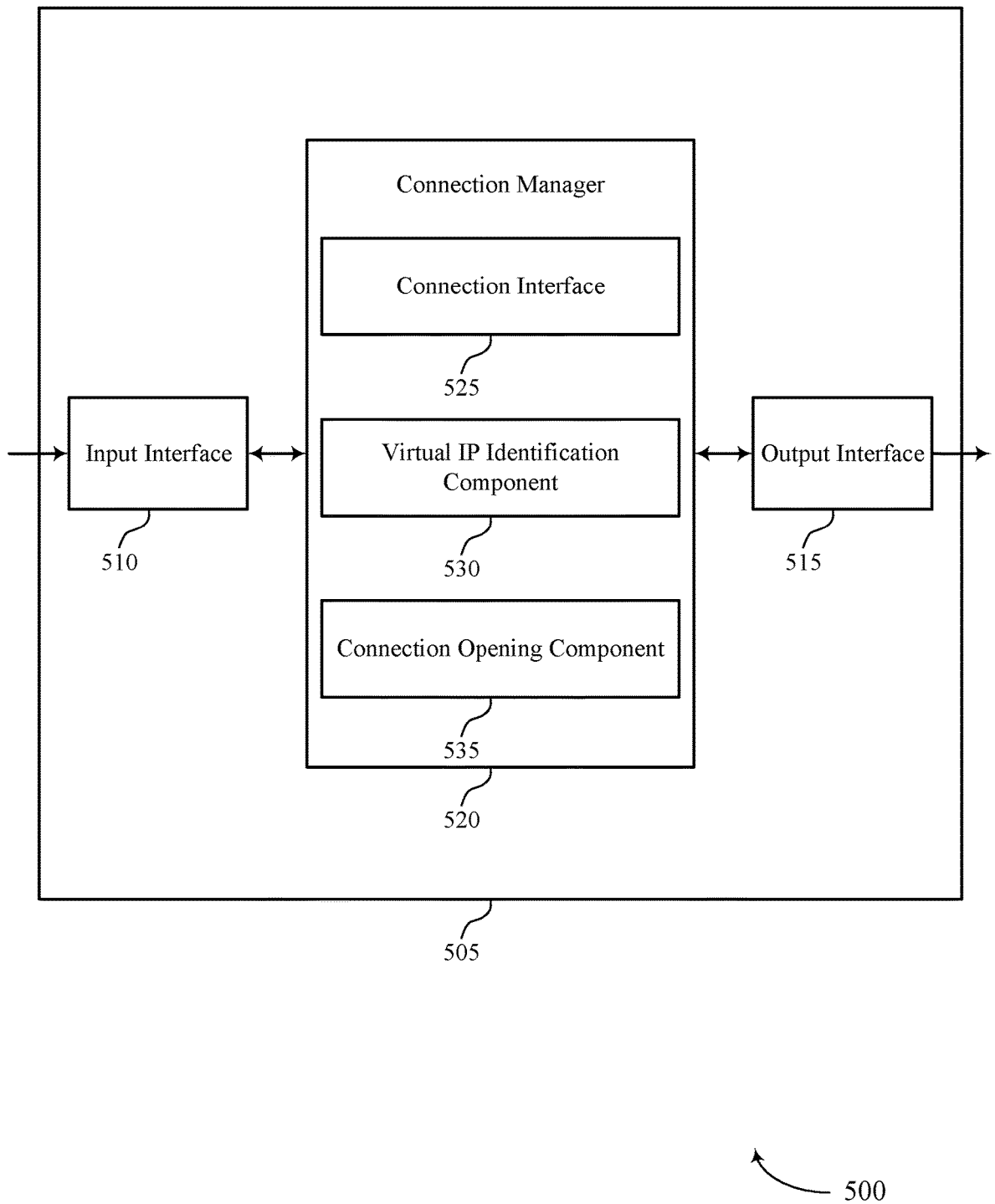
FIG. 5 shows a block diagram of an apparatus that supports internet protocol based security over port forwarding tunnels in accordance with aspects of the present disclosure.

FIG. 5 shows a block diagram 500 of a system 505 that supports IP based security over port forwarding tunnels in accordance with aspects of the present disclosure. In some examples, the system 505 may be an example of aspects of one or more components described with respect to FIG. 1, such as a DMS 110 or a server 125. The system 505 may include an input interface 510, an output interface 515, and a connection manager 520. The system 505 may also include one or more processors. Each of these components may be in communication with one another (e.g., via one or more communications links, communications interfaces, or any combination thereof).

The input interface 510 may manage input signals for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the connection manager 520 to support IP based security over port forwarding tunnels. In some cases, the input interface 510 may be a component of a network interface 710 as described with reference to FIG. 7.

The output interface 515 may manage output signaling for the system 505. For example, the output interface 515 may receive signaling from other components of the system 505, such as the connection manager 520, and may transmit such output signaling corresponding to (e.g., representative of or otherwise based on) such signaling to other systems or devices. In some cases, the output interface 515 may be a component of a network interface 710 as described with reference to FIG. 7

The connection manager 520 may include a connection interface 525, a virtual IP identification component 530, a connection opening component 535, or any combination thereof. In some examples, the connection manager 520, or various components thereof, may be configured to perform various operations (e.g., receiving, monitoring, transmitting)

using or otherwise in cooperation with the input interface 510, the output interface 515, or both. For example, the connection manager 520 may receive information from the input interface 510, send information to the output interface 515, or be integrated in combination with the input interface 510, the output interface 515, or both to receive information, transmit information, or perform various other operations as described herein.

The connection interface 525 may be configured as or otherwise support a means for receiving, at an application server host and via a port forwarding tunnel, a connection request that includes an indication of a client IP (IP) address for a client host. The virtual IP identification component 530 may be configured as or otherwise support a means for identifying, based on the client IP address and using a mapping maintained for a set of multiple client hosts, a virtual IP address that is associated with the client IP address and a client network identifier associated with the port forwarding tunnel from which the connection request is received. The connection opening component 535 may be configured as or otherwise support a means for opening a connection between an application server hosted by the application server host and the client host using the identified virtual IP address.

Figure 6:
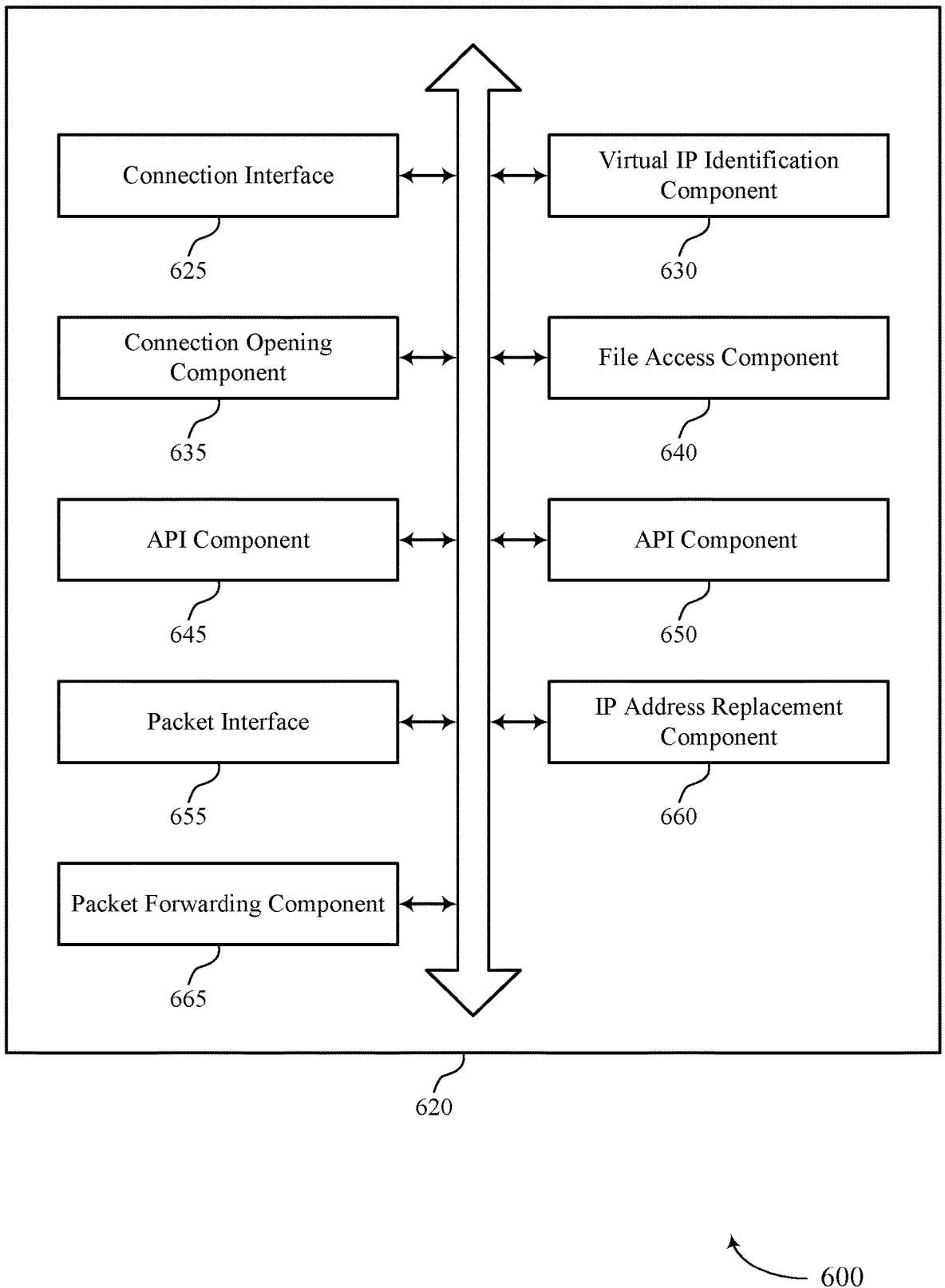
FIG. 6 shows a block diagram of a connection manager that supports internet protocol based security over port forwarding tunnels in accordance with aspects of the present disclosure.

FIG. 6 shows a block diagram 600 of a connection manager 620 that supports IP based security over port forwarding tunnels in accordance with aspects of the present disclosure. The connection manager 620 may be an example of aspects of a connection manager 520 as described herein. The connection manager 620, or various components thereof, may be an example of means for performing various aspects of IP based security over port forwarding tunnels as described herein. For example, the connection manager 620 may include a connection interface 625, a virtual IP identification component 630, a connection opening component 635, a file access component 640, an API component 645, an API component 650, a packet interface 655, an IP address replacement component 660, a packet forwarding component 665, or any combination thereof. Each of these components may communicate, directly or indirectly, with one another (e.g., via one or more buses communications links, communications interfaces, or any combination thereof).

The connection interface 625 may be configured as or otherwise support a means for receiving, at an application server host and via a port forwarding tunnel, a connection request that includes an indication of a client IP (IP) address for a client host. The virtual IP identification component 630 may be configured as or otherwise support a means for identifying, based on the client IP address and using a mapping maintained for a set of multiple client hosts, a virtual IP address that is associated with the client IP address and a client network identifier associated with the port forwarding tunnel from which the connection request is received. The connection opening component 635 may be configured as or otherwise support a means for opening a connection between an application server hosted by the application server host and the client host using the identified virtual IP address.

In some examples, to support identifying the virtual IP address, the file access component 640 may be configured as or otherwise support a means for identifying, based on the client IP address and the client network identifier, the virtual IP address from a file including the mapping and maintained at the application server host.

In some examples, to support identifying the virtual IP address, the API component 645 may be configured as or otherwise support a means for transmitting, via an application programming interface (API), a request for the virtual IP address, where the request includes the client IP address and the client network identifier. In some examples, to support identifying the virtual IP address, the API component 650 may be configured as or otherwise support a means for receiving, in response to the request, an indication of the virtual IP address.

In some examples, the connection interface 625 may be configured as or otherwise support a means for receiving, at an application server host and via a second port forwarding tunnel, a second connection request that includes an indication of a second client IP address for a second client host, where the second client IP address has a same value as the client IP address. In some examples, the virtual IP identification component 630 may be configured as or otherwise support a means for identifying, based on the second client IP address and using the mapping, a second virtual IP address that is associated with the second client IP address and a second client network identifier associated with the second port forwarding tunnel from which the connection request is received, where the second client network identifier is used to differentiate between the second client IP address and the client IP address that have the same value. In some examples, the connection opening component 635 may be configured as or otherwise support a means for opening a second connection between the application server hosted and the second client host using the identified second virtual IP address.

In some examples, to support receiving the connection request, the connection interface 625 may be configured as or otherwise support a means for receiving the connection request via a tunnel endpoint for the port forwarding tunnel, where the tunnel endpoint is provisioned for access by a set of multiple client hosts associated with the client network identifier.

In some examples, the set of multiple client hosts are associated with a set of multiple loopback IP addresses in the mapping. In some examples, the application server host is configured to enforce security policies based on the identified virtual IP address.

In some examples, the packet interface 655 may be configured as or otherwise support a means for receiving, via the connection, a packet that is to be received at the application server, where the packet includes an IP address associated with the port forwarding tunnel. In some examples, the IP address replacement component 660 may be configured as or otherwise support a means for replacing the IP address associated with the port forwarding tunnel with the virtual IP address associated with the client host based on the connection via which the packet is received. In some examples, the packet forwarding component 665 may be configured as or otherwise support a means for forwarding the packet to the application server.

Figure 7:
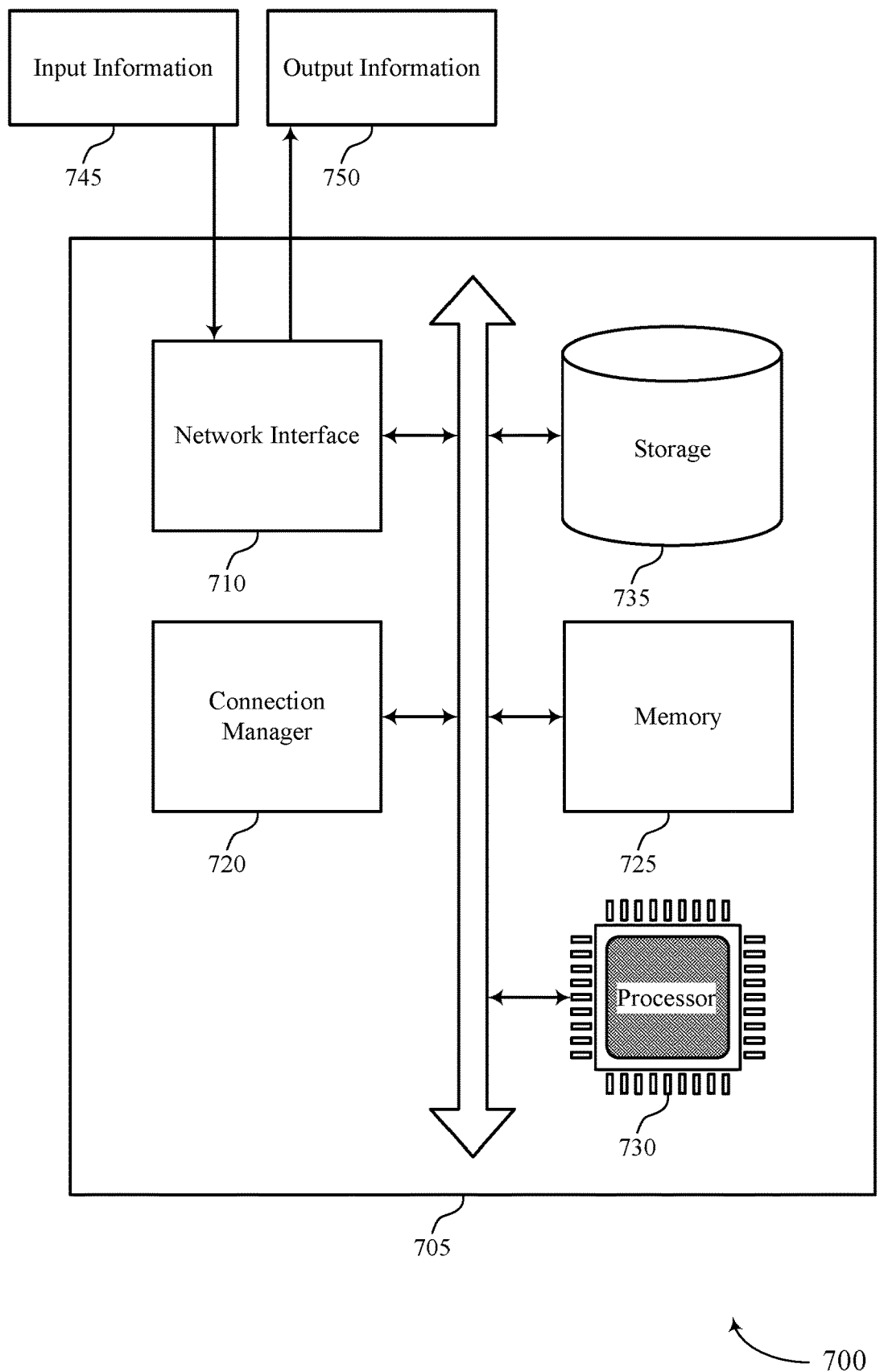
FIG. 7 shows a diagram of a system including a device that supports internet protocol based security over port forwarding tunnels in accordance with aspects of the present disclosure.

FIG. 7 shows a block diagram 700 of a system 705 that supports IP based security over port forwarding tunnels in accordance with aspects of the present disclosure. The system 705 may be an example of or include the components of a system 505 as described herein. The system 705 may include components for data management, such as a connection manager 720, a network interface 710, memory 725, processor 730, and storage 735. These components may be in electronic communication or otherwise coupled with each other (e.g., operatively, communicatively, functionally, electronically, electrically; via one or more buses, communications links, communications interfaces, or any combination thereof). Additionally, the components of the system 505 may comprise corresponding physical components or may be implemented as corresponding virtual components (e.g., components of one or more virtual machines). In some examples, the system 705 may be an example of aspects of one or more components described with reference to FIG. 1, such as a DMS 110 or server 125, or one or application servers or client networks as described with respect to FIGS. 2 through 4.

The network interface 710 may enable the system 705 to exchange information (e.g., input information 745, output information, 750, or both) with other systems or devices (not shown). For example, the network interface 710 may include one or more wireless network interfaces, one or more wired network interfaces, or any combination thereof. In some examples, the network interface 710 may be an example of may be an example of aspects of one or more components described with reference to FIG. 1, such as one or more network interfaces 165 or similar components of other systems such as server 125 or application server hosts or client network as described with respect to FIGS. 2 through 4.

Memory 725 may include RAM, ROM, or both. The memory 725 may store computer-readable, computer-executable software including instructions that, when executed, cause the processor 730 to perform various functions described herein. In some cases, the memory 725 may contain, among other things, a basic input/output system (BIOS), which may control basic hardware or software operation such as the interaction with peripheral components or devices. In some cases, the memory 725 may be an example of aspects of one or more components described with reference to FIG. 1, such as one or more memories 175, or one or more aspects of components of FIGS. 2 through 4, such as aspects of the application server host or the client network.

The processor 730 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 730 may be configured to execute computer-readable instructions stored in the memory 725 to perform various functions (e.g., functions or tasks supporting IP based security over port forwarding tunnels). Through a single processor 730 is depicted in the example of FIG. 7, it should be understood that the system 705 may include any quantity of one or more of processors 730 and that a group of processors 730 may collectively perform one or more functions ascribed herein to a processor, such as the processor 730. In some cases, the processor 730 may be an example of aspects of one or more components described with reference to FIG. 1, such as one or more processors 170, or one or more aspects of components of FIGS. 2 through 4, such as aspects of the application server host or the client network.

Storage 735 may be configured to store data that is generated, processed, stored, or otherwise used by the system 705. In some cases, the storage 735 may include one or more HDDs, one or more SDDs, or both. In some examples, the storage 735 may be an example of a single database, a distributed database, multiple distributed databases, a data store, a data lake, or an emergency backup database. In some examples, the storage 735 may be an example of one or more components described with reference to FIG. 1, such as one or more network disks 180 or one or more aspects of components of FIGS. 2 through 4, such as aspects of the application server host or the client network.

The connection manager 720 may be configured as or otherwise support a means for receiving, at an application server host and via a port forwarding tunnel, a connection request that includes an indication of a client IP (IP) address for a client host. The connection manager 720 may be configured as or otherwise support a means for identifying, based on the client IP address and using a mapping maintained for a set of multiple client hosts, a virtual IP address that is associated with the client IP address and a client network identifier associated with the port forwarding tunnel from which the connection request is received. The connection manager 720 may be configured as or otherwise support a means for opening a connection between an application server hosted by the application server host and the client host using the identified virtual IP address.

By including or configuring the connection manager 720 in accordance with examples as described herein, the system 705 may support techniques for secure access to computing resources, such as resources of an application server using virtual IP based security policies. The techniques may be secured via a virtual IP mapping and may support secure port forwarding tunneling techniques with or more client domains (e.g., client networks).

Figure 8:
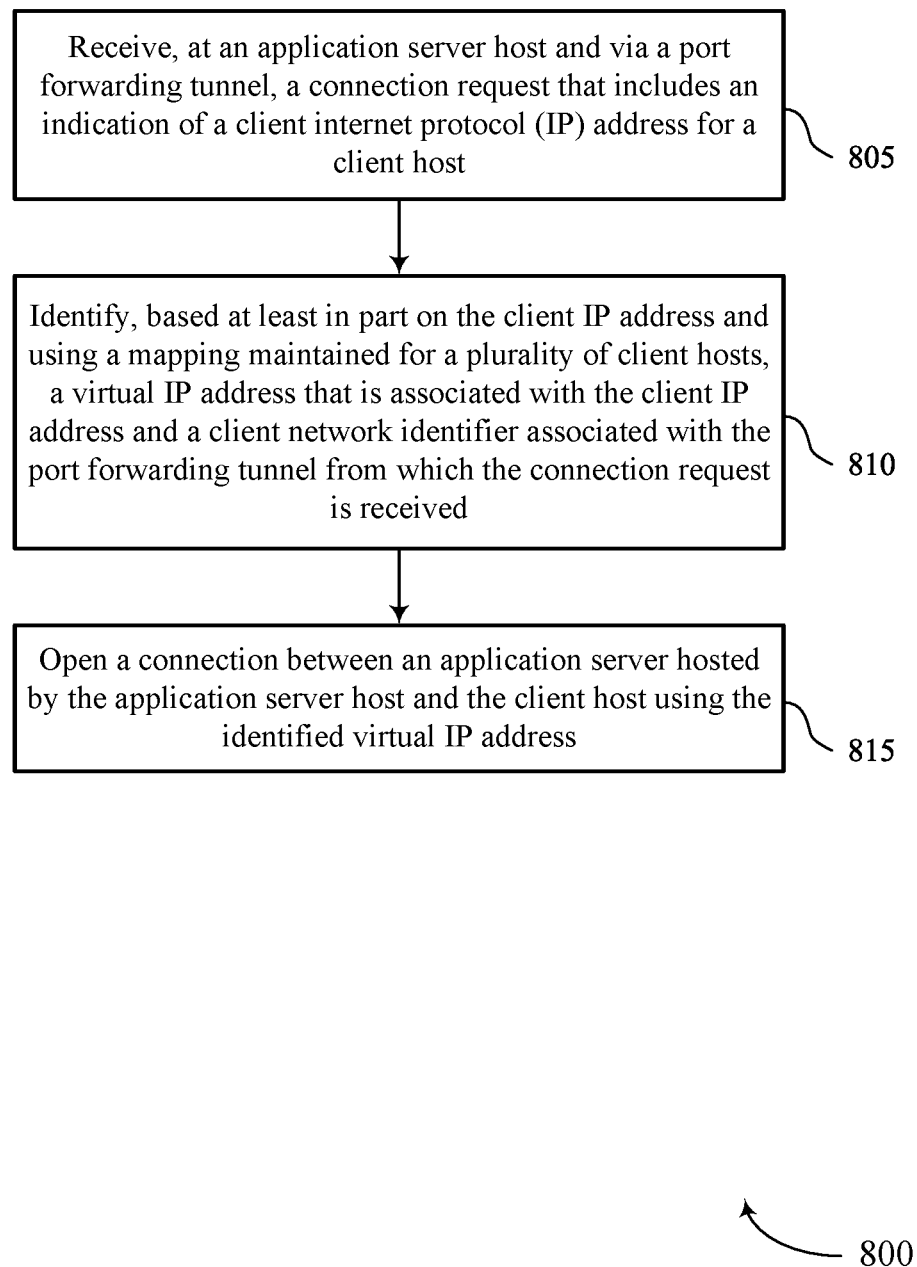
FIGS. 8 through 12 show flowcharts illustrating methods that support internet protocol based security over port forwarding tunnels in accordance with aspects of the present disclosure.

FIG. 8 shows a flowchart illustrating a method 800 that supports IP based security over port forwarding tunnels in accordance with aspects of the present disclosure. The operations of the method 800 may be implemented by a server host or its components as described herein. For example, the operations of the method 800 may be performed by a DMS or server host as described with reference to FIGS. 1 through 7. In some examples, a DMS or server host may execute a set of instructions to control the functional elements of the server host to perform the described functions. Additionally, or alternatively, the DMS or server host may perform aspects of the described functions using special-purpose hardware.

At 805, the method may include receiving, at an application server host and via a port forwarding tunnel, a connection request that includes an indication of a client IP (IP) address for a client host. The operations of 805 may be performed in accordance with examples as disclosed herein. In some examples, aspects of the operations of 805 may be performed by a connection interface 625 as described with reference to FIG. 6.

At 810, the method may include identifying, based on the client IP address and using a mapping maintained for a set of multiple client hosts, a virtual IP address that is associated with the client IP address and a client network identifier associated with the port forwarding tunnel from which the connection request is received. The operations of 810 may be performed in accordance with examples as disclosed herein. In some examples, aspects of the operations of 810 may be performed by a virtual IP identification component 630 as described with reference to FIG. 6.

At 815, the method may include opening a connection between an application server hosted by the application server host and the client host using the identified virtual IP address. The operations of 815 may be performed in accordance with examples as disclosed herein. In some examples, aspects of the operations of 815 may be performed by a connection opening component 635 as described with reference to FIG. 6.

Figure 9:
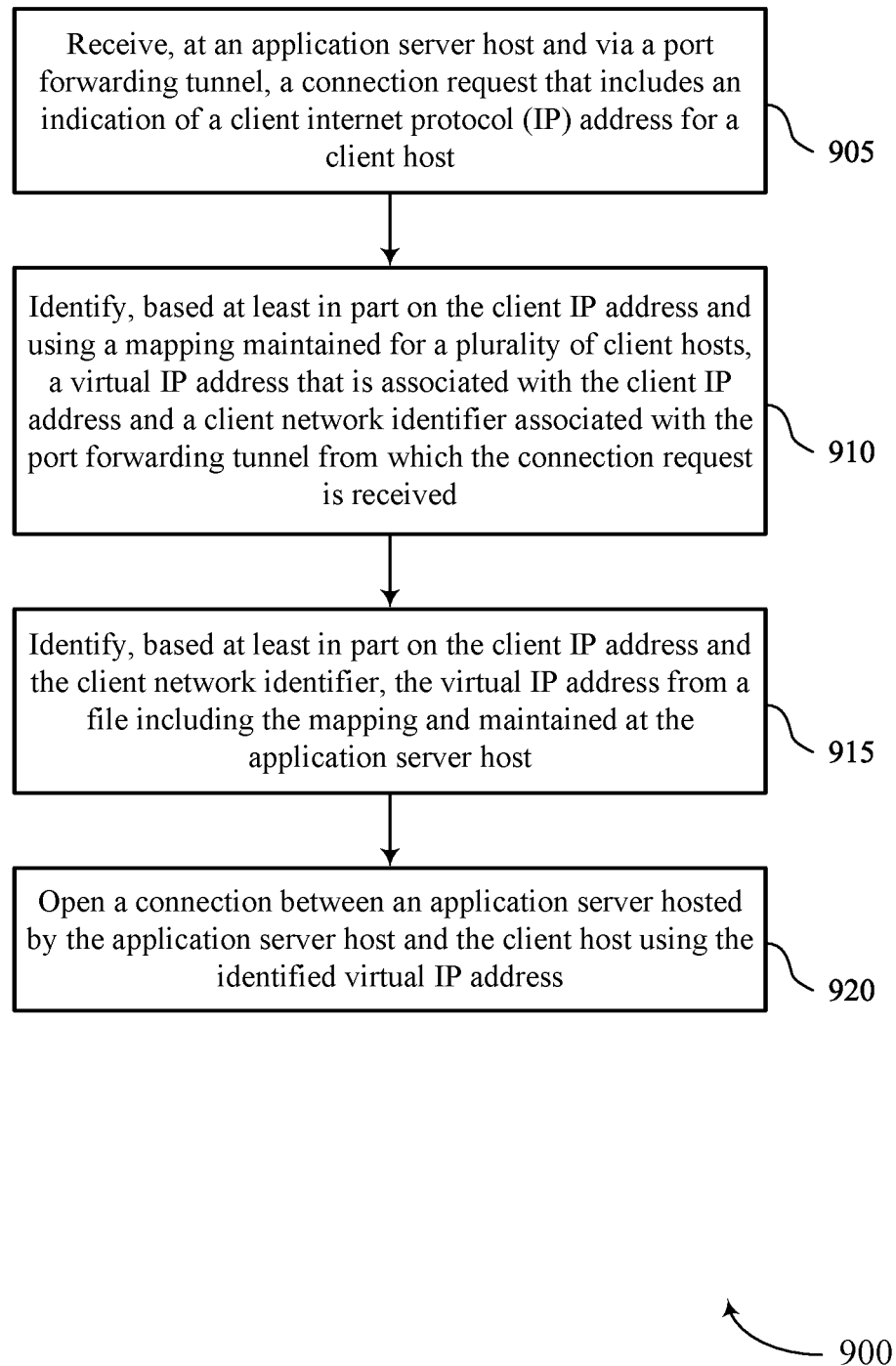

FIG. 9 shows a flowchart illustrating a method 900 that supports IP based security over port forwarding tunnels in accordance with aspects of the present disclosure. The operations of the method 900 may be implemented by a server host or its components as described herein. For example, the operations of the method 900 may be performed by a server host as described with reference to FIGS. 1 through 7. In some examples, a DMS or server host may execute a set of instructions to control the functional elements of the server host to perform the described functions. Additionally, or alternatively, the DMS or server host may perform aspects of the described functions using special-purpose hardware.

At 905, the method may include receiving, at an application server host and via a port forwarding tunnel, a connection request that includes an indication of a client IP (IP) address for a client host. The operations of 905 may be performed in accordance with examples as disclosed herein. In some examples, aspects of the operations of 905 may be performed by a connection interface 625 as described with reference to FIG. 6.

At 910, the method may include identifying, based on the client IP address and using a mapping maintained for a set of multiple client hosts, a virtual IP address that is associated with the client IP address and a client network identifier associated with the port forwarding tunnel from which the connection request is received. The operations of 910 may be performed in accordance with examples as disclosed herein. In some examples, aspects of the operations of 910 may be performed by a virtual IP identification component 630 as described with reference to FIG. 6.

At 915, the method may include identifying, based on the client IP address and the client network identifier, the virtual IP address from a file including the mapping and maintained at the application server host. The operations of 915 may be performed in accordance with examples as disclosed herein. In some examples, aspects of the operations of 915 may be performed by a file access component 640 as described with reference to FIG. 6.

At 920, the method may include opening a connection between an application server hosted by the application server host and the client host using the identified virtual IP address. The operations of 920 may be performed in accordance with examples as disclosed herein. In some examples, aspects of the operations of 920 may be performed by a connection opening component 635 as described with reference to FIG. 6.

Figure 10:
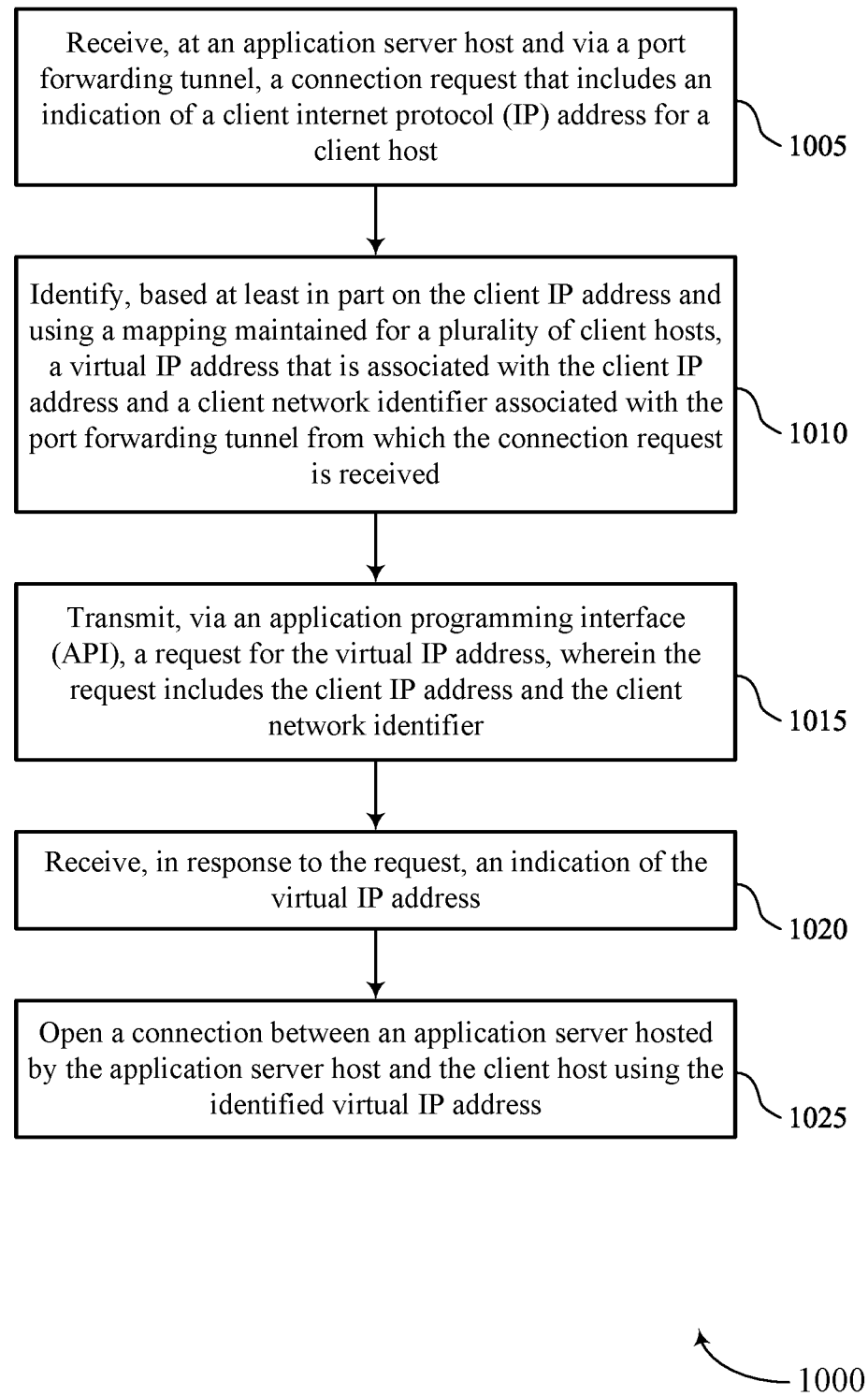

FIG. 10 shows a flowchart illustrating a method 1000 that supports IP based security over port forwarding tunnels in accordance with aspects of the present disclosure. The operations of the method 1000 may be implemented by a server host or its components as described herein. For example, the operations of the method 1000 may be performed by a server host as described with reference to FIGS. 1 through 7. In some examples, a DMS or server host may execute a set of instructions to control the functional elements of the server host to perform the described functions. Additionally, or alternatively, the DMS or server host may perform aspects of the described functions using special-purpose hardware.

At 1005, the method may include receiving, at an application server host and via a port forwarding tunnel, a connection request that includes an indication of a client IP (IP) address for a client host. The operations of 1005 may be performed in accordance with examples as disclosed herein. In some examples, aspects of the operations of 1005 may be performed by a connection interface 625 as described with reference to FIG. 6.

At 1010, the method may include identifying, based on the client IP address and using a mapping maintained for a set of multiple client hosts, a virtual IP address that is associated with the client IP address and a client network identifier associated with the port forwarding tunnel from which the connection request is received. The operations of 1010 may be performed in accordance with examples as disclosed herein. In some examples, aspects of the operations of 1010 may be performed by a virtual IP identification component 630 as described with reference to FIG. 6.

At 1015, the method may include transmitting, via an application programming interface (API), a request for the virtual IP address, where the request includes the client IP address and the client network identifier. The operations of 1015 may be performed in accordance with examples as disclosed herein. In some examples, aspects of the operations of 1015 may be performed by an API component 645 as described with reference to FIG. 6.

At 1020, the method may include receiving, in response to the request, an indication of the virtual IP address. The operations of 1020 may be performed in accordance with examples as disclosed herein. In some examples, aspects of the operations of 1020 may be performed by an API component 650 as described with reference to FIG. 6.

At 1025, the method may include opening a connection between an application server hosted by the application server host and the client host using the identified virtual IP address. The operations of 1025 may be performed in accordance with examples as disclosed herein. In some examples, aspects of the operations of 1025 may be performed by a connection opening component 635 as described with reference to FIG. 6.

Figure 11:
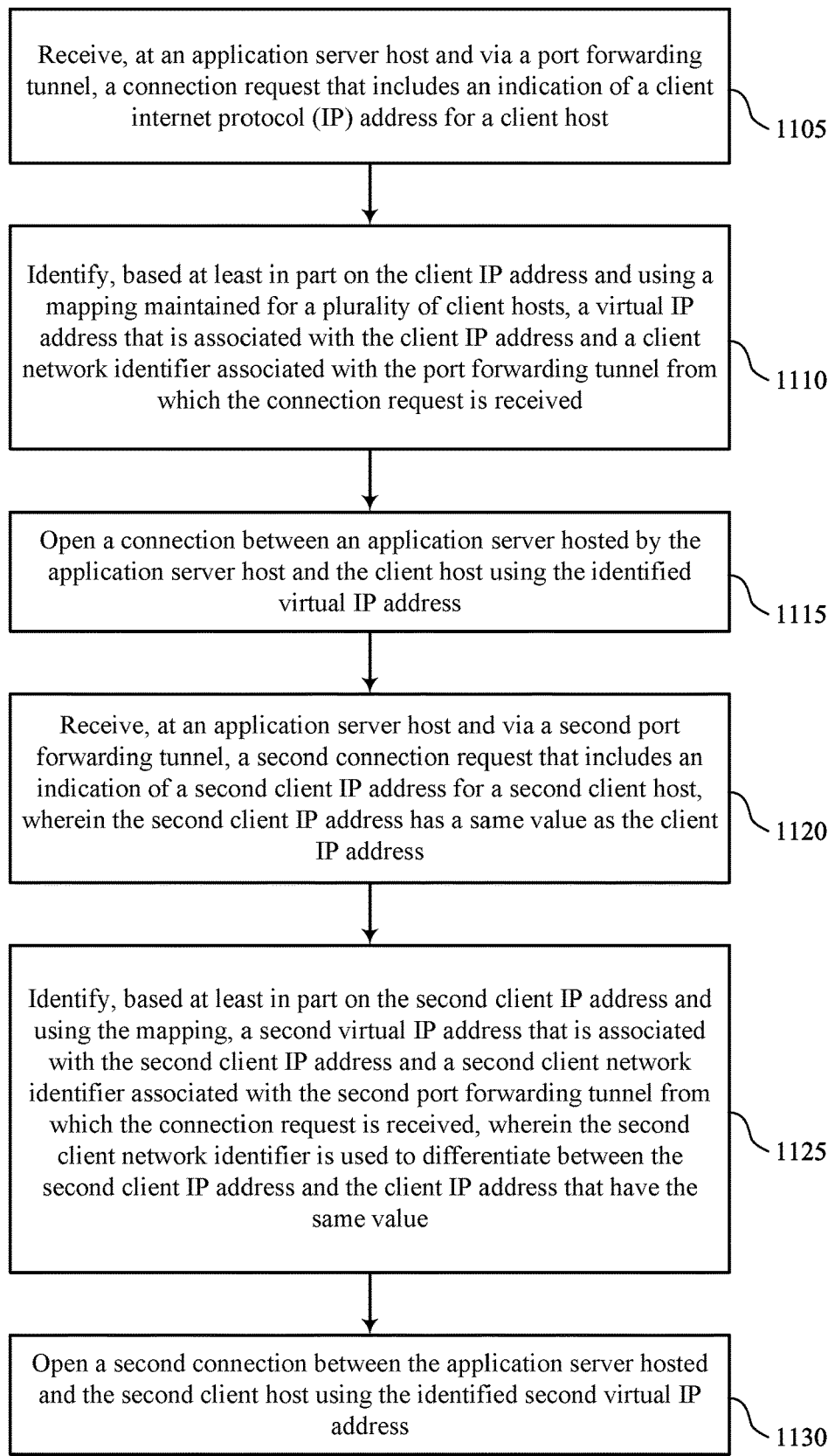

FIG. 11 shows a flowchart illustrating a method 1100 that supports IP based security over port forwarding tunnels in accordance with aspects of the present disclosure. The operations of the method 1100 may be implemented by a server host or its components as described herein. For example, the operations of the method 1100 may be performed by a server host as described with reference to FIGS. 1 through 7. In some examples, a DMS or server host may execute a set of instructions to control the functional elements of the server host to perform the described functions. Additionally, or alternatively, the DMS or server host may perform aspects of the described functions using special-purpose hardware.

At 1105, the method may include receiving, at an application server host and via a port forwarding tunnel, a connection request that includes an indication of a client IP (IP) address for a client host. The operations of 1105 may be performed in accordance with examples as disclosed herein. In some examples, aspects of the operations of 1105 may be performed by a connection interface 625 as described with reference to FIG. 6.

At 1110, the method may include identifying, based on the client IP address and using a mapping maintained for a set of multiple client hosts, a virtual IP address that is associated with the client IP address and a client network identifier associated with the port forwarding tunnel from which the connection request is received. The operations of 1110 may be performed in accordance with examples as disclosed herein. In some examples, aspects of the operations of 1110 may be performed by a virtual IP identification component 630 as described with reference to FIG. 6.

At 1115, the method may include opening a connection between an application server hosted by the application server host and the client host using the identified virtual IP address. The operations of 1115 may be performed in accordance with examples as disclosed herein. In some examples, aspects of the operations of 1115 may be performed by a connection opening component 635 as described with reference to FIG. 6.

At 1120, the method may include receiving, at an application server host and via a second port forwarding tunnel, a second connection request that includes an indication of a second client IP address for a second client host, where the second client IP address has a same value as the client IP address. The operations of 1120 may be performed in accordance with examples as disclosed herein. In some examples, aspects of the operations of 1120 may be performed by a connection interface 625 as described with reference to FIG. 6.

At 1125, the method may include identifying, based on the second client IP address and using the mapping, a second virtual IP address that is associated with the second client IP address and a second client network identifier associated with the second port forwarding tunnel from which the connection request is received, where the second client network identifier is used to differentiate between the second client IP address and the client IP address that have the same value. The operations of 1125 may be performed in accordance with examples as disclosed herein. In some examples, aspects of the operations of 1125 may be performed by a virtual IP identification component 630 as described with reference to FIG. 6.

At 1130, the method may include opening a second connection between the application server hosted and the second client host using the identified second virtual IP address. The operations of 1130 may be performed in accordance with examples as disclosed herein. In some examples, aspects of the operations of 1130 may be performed by a connection opening component 635 as described with reference to FIG. 6.

Figure 12:
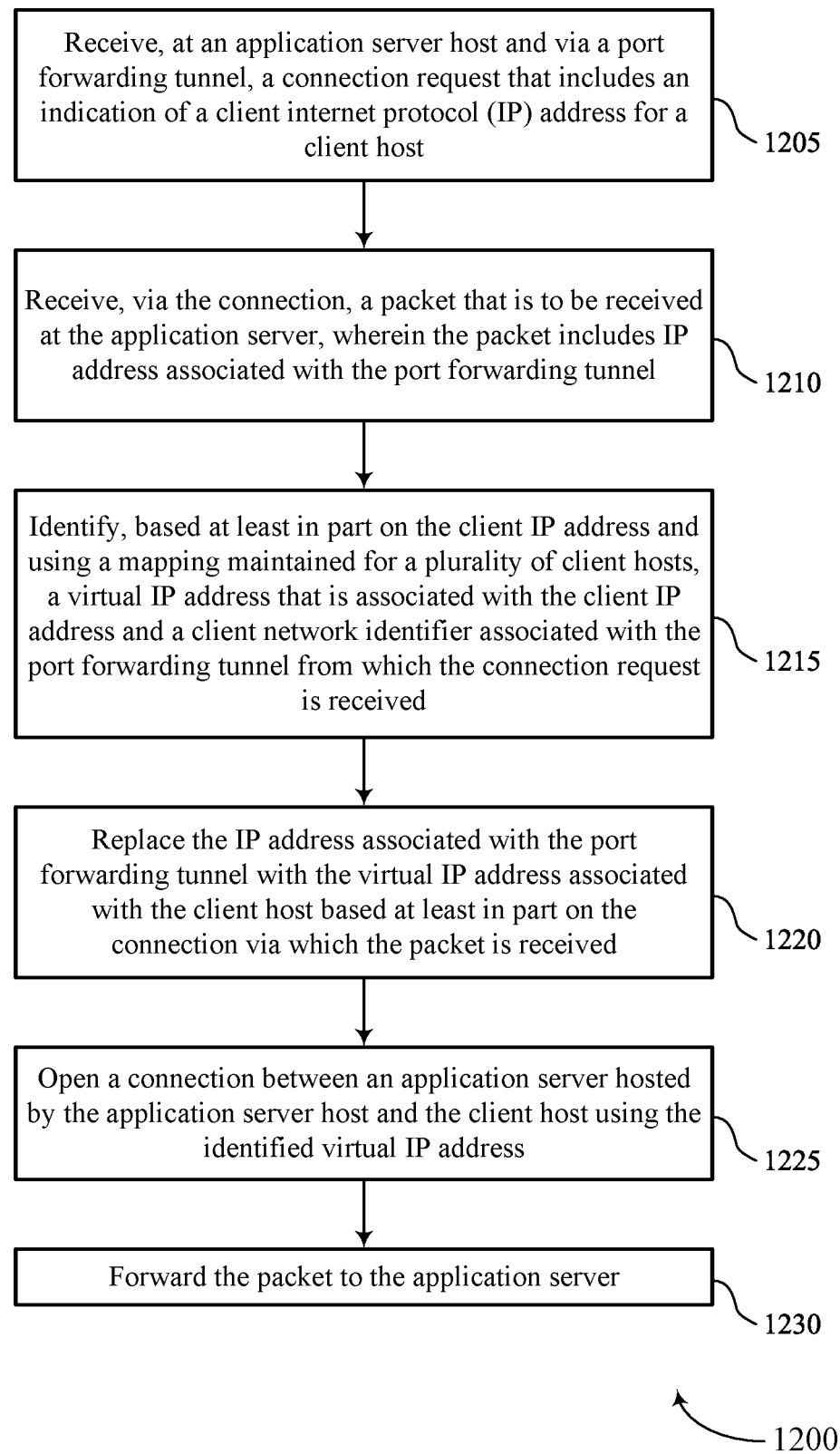

FIG. 12 shows a flowchart illustrating a method 1200 that supports IP based security over port forwarding tunnels in accordance with aspects of the present disclosure. The operations of the method 1200 may be implemented by a server host or its components as described herein. For example, the operations of the method 1200 may be performed by a server host as described with reference to FIGS. 1 through 7. In some examples, a DMS or server host may execute a set of instructions to control the functional elements of the server host to perform the described functions. Additionally, or alternatively, the DMS or server host may perform aspects of the described functions using special-purpose hardware.

At 1205, the method may include receiving, at an application server host and via a port forwarding tunnel, a connection request that includes an indication of a client IP (IP) address for a client host. The operations of 1205 may be performed in accordance with examples as disclosed herein. In some examples, aspects of the operations of 1205 may be performed by a connection interface 625 as described with reference to FIG. 6.

At 1210, the method may include receiving, via the connection, a packet that is to be received at the application server, where the packet includes an IP address associated with the port forwarding tunnel. The operations of 1210 may be performed in accordance with examples as disclosed herein. In some examples, aspects of the operations of 1210 may be performed by a packet interface 655 as described with reference to FIG. 6.

At 1215, the method may include identifying, based on the client IP address and using a mapping maintained for a set of multiple client hosts, a virtual IP address that is associated with the client IP address and a client network identifier associated with the port forwarding tunnel from which the connection request is received. The operations of 1215 may be performed in accordance with examples as disclosed herein. In some examples, aspects of the operations of 1215 may be performed by a virtual IP identification component 630 as described with reference to FIG. 6.

At 1220, the method may include replacing the IP address associated with the port forwarding tunnel with the virtual IP address associated with the client host based on the connection via which the packet is received. The operations of 1220 may be performed in accordance with examples as disclosed herein. In some examples, aspects of the operations of 1220 may be performed by an IP address replacement component 660 as described with reference to FIG. 6.

At 1225, the method may include opening a connection between an application server hosted by the application server host and the client host using the identified virtual IP address. The operations of 1225 may be performed in accordance with examples as disclosed herein. In some examples, aspects of the operations of 1225 may be performed by a connection opening component 635 as described with reference to FIG. 6.

At 1230, the method may include forwarding the packet to the application server. The operations of 1230 may be performed in accordance with examples as disclosed herein. In some examples, aspects of the operations of 1230 may be performed by a packet forwarding component 665 as described with reference to FIG. 6.

A method is described. The method may include receiving, at an application server host and via a port forwarding tunnel, a connection request that includes an indication of a client IP (IP) address for a client host, identifying, based on the client IP address and using a mapping maintained for a set of multiple client hosts, a virtual IP address that is associated with the client IP address and a client network identifier associated with the port forwarding tunnel from which the connection request is received, and opening a connection between an application server hosted by the application server host and the client host using the identified virtual IP address.

An apparatus is described. The apparatus may include a processor, memory coupled with the processor, and instructions stored in the memory. The instructions may be executable by the processor to cause the apparatus to receive, at an application server host and via a port forwarding tunnel, a connection request that includes an indication of a client IP (IP) address for a client host, identify, based on the client IP address and using a mapping maintained for a set of multiple client hosts, a virtual IP address that is associated with the client IP address and a client network identifier associated with the port forwarding tunnel from which the connection request is received, and open a connection between an application server hosted by the application server host and the client host using the identified virtual IP address.

Another apparatus is described. The apparatus may include means for receiving, at an application server host and via a port forwarding tunnel, a connection request that includes an indication of a client IP (IP) address for a client host, means for identifying, based on the client IP address and using a mapping maintained for a set of multiple client hosts, a virtual IP address that is associated with the client IP address and a client network identifier associated with the port forwarding tunnel from which the connection request is received, and means for opening a connection between an application server hosted by the application server host and the client host using the identified virtual IP address.

A non-transitory computer-readable medium storing code is described. The code may include instructions executable by a processor to receive, at an application server host and via a port forwarding tunnel, a connection request that includes an indication of a client IP (IP) address for a client host, identify, based on the client IP address and using a mapping maintained for a set of multiple client hosts, a virtual IP address that is associated with the client IP address and a client network identifier associated with the port forwarding tunnel from which the connection request is received, and open a connection between an application server hosted by the application server host and the client host using the identified virtual IP address.

In some examples of the method, apparatuses, and non-transitory computer-readable medium described herein, identifying the virtual IP address may include operations, features, means, or instructions for identifying, based on the client IP address and the client network identifier, the virtual IP address from a file including the mapping and maintained at the application server host.

In some examples of the method, apparatuses, and non-transitory computer-readable medium described herein, identifying the virtual IP address may include operations, features, means, or instructions for transmitting, via an application programming interface (API), a request for the virtual IP address, where the request includes the client IP address and the client network identifier and receiving, in response to the request, an indication of the virtual IP address.

Some examples of the method, apparatuses, and non-transitory computer-readable medium described herein may further include operations, features, means, or instructions for receiving, at an application server host and via a second port forwarding tunnel, a second connection request that includes an indication of a second client IP address for a second client host, where the second client IP address may have a same value as the client IP address, identifying, based on the second client IP address and using the mapping, a second virtual IP address that may be associated with the second client IP address and a second client network identifier associated with the second port forwarding tunnel from which the connection request may be received, where the second client network identifier may be used to differentiate between the second client IP address and the client IP address that may have the same value, and opening a second connection between the application server hosted and the second client host using the identified second virtual IP address.

In some examples of the method, apparatuses, and non-transitory computer-readable medium described herein, receiving the connection request may include operations, features, means, or instructions for receiving the connection request via a tunnel endpoint for the port forwarding tunnel, where the tunnel endpoint may be provisioned for access by a set of multiple client hosts associated with the client network identifier.

In some examples of the method, apparatuses, and non-transitory computer-readable medium described herein, the set of multiple client hosts may be associated with a set of multiple loopback IP addresses in the mapping.

In some examples of the method, apparatuses, and non-transitory computer-readable medium described herein, the application server host may be configured to enforce security policies based on the identified virtual IP address.

Some examples of the method, apparatuses, and non-transitory computer-readable medium described herein may further include operations, features, means, or instructions for receiving, via the connection, a packet that may be received at the application server, where the packet includes an IP address associated with the port forwarding tunnel, replacing the IP address associated with the port forwarding tunnel with the virtual IP address associated with the client host based on the connection via which the packet may be received, and forwarding the packet to the application server.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data management comprising:
    receiving, at an application server host and via a port forwarding tunnel, a connection request that includes an indication of a client internet protocol (IP) address for a client host;
    identifying, based at least in part on the client IP address and using a mapping maintained for a plurality of client hosts, a virtual IP address that is assigned to both the client IP address and a client network identifier, wherein the client network identifier is mapped to the port forwarding tunnel from which the connection request is received; and
    opening a connection between an application server hosted by the application server host and the client host using the identified virtual IP address.

2. The method of claim 1, wherein identifying the virtual IP address comprises:
    identifying, based at least in part on the client IP address and the client network identifier, the virtual IP address from a file including the mapping and maintained at the application server host.

3. The method of claim 1, wherein identifying the virtual IP address comprises:
    transmitting, via an application programming interface (API), a request for the virtual IP address, wherein the request includes the client IP address and the client network identifier; and
    receiving, in response to the request, an indication of the virtual IP address.

4. The method of claim 1, further comprising:
    receiving, at the application server host and via a second port forwarding tunnel, a second connection request that includes an indication of a second client IP address for a second client host, wherein the second client IP address has a same value as the client IP address;
    identifying, based at least in part on the second client IP address and using the mapping, a second virtual IP address that is assigned to both the second client IP address and a second client network identifier, wherein the client network identifier is mapped to the second port forwarding tunnel from which the connection request is received, wherein the second client network identifier is used to differentiate between the second client IP address and the client IP address that have the same value; and
    opening a second connection between the application server hosted and the second client host using the identified second virtual IP address.

5. The method of claim 1, wherein receiving the connection request comprises:
    receiving the connection request via a tunnel endpoint for the port forwarding tunnel, wherein the tunnel endpoint is provisioned for access by a second plurality of client hosts associated with the client network identifier.

6. The method of claim 1, wherein the plurality of client hosts are associated with a plurality of loopback IP addresses in the mapping.

7. The method of claim 1, wherein the application server host is configured to enforce security policies based at least in part on the identified virtual IP address.

8. The method of claim 1, further comprising:
    receiving, via the connection, a packet that is to be received at the application server, wherein the packet includes an IP address associated with the port forwarding tunnel;
    replacing the IP address associated with the port forwarding tunnel with the virtual IP address associated with the client host based at least in part on the connection via which the packet is received; and
    forwarding the packet to the application server.

9. An apparatus, comprising:
    a processor;
    memory coupled with the processor; and
    instructions stored in the memory and executable by the processor to cause the apparatus to:
        receive, at an application server host and via a port forwarding tunnel, a connection request that includes an indication of a client internet protocol (IP) address for a client host;
        identify, based at least in part on the client IP address and using a mapping maintained for a plurality of client hosts, a virtual IP address that is assigned to both the client IP address and a client network identifier, wherein the client network identifier is mapped to the port forwarding tunnel from which the connection request is received; and open a connection between an application server hosted by the application server host and the client host using the identified virtual IP address.

10. The apparatus of claim 9, wherein the instructions to identify the virtual IP address are executable by the processor to cause the apparatus to:

identify, based at least in part on the client IP address and the client network identifier, the virtual IP address from a file including the mapping and maintained at the application server host.

11. The apparatus of claim 9, wherein the instructions to identify the virtual IP address are executable by the processor to cause the apparatus to:

transmit, via an application programming interface (API), a request for the virtual IP address, wherein the request includes the client IP address and the client network identifier; and receive, in response to the request, an indication of the virtual IP address.

12. The apparatus of claim 9, wherein the instructions are further executable by the processor to cause the apparatus to:

receive, at the application server host and via a second port forwarding tunnel, a second connection request that includes an indication of a second client IP address for a second client host, wherein the second client IP address has a same value as the client IP address;

identify, based at least in part on the second client IP address and using the mapping, a second virtual IP address that is assigned to both the second client IP address and a second client network identifier, wherein the client network identifier is mapped to the second port forwarding tunnel from which the connection request is received, wherein the second client network identifier is used to differentiate between the second client IP address and the client IP address that have the same value; and open a second connection between the application server hosted and the second client host using the identified second virtual IP address.

13. The apparatus of claim 9, wherein the instructions to receive the connection request are executable by the processor to cause the apparatus to:

receive the connection request via a tunnel endpoint for the port forwarding tunnel, wherein the tunnel endpoint is provisioned for access by a second plurality of client hosts associated with the client network identifier.

14. The apparatus of claim 9, wherein the plurality of client hosts are associated with a plurality of loopback IP addresses in the mapping.

15. The apparatus of claim 9, wherein the application server host is configured to enforce security policies based at least in part on the identified virtual IP address.

16. The apparatus of claim 9, wherein the instructions are further executable by the processor to cause the apparatus to:

receive, via the connection, a packet that is to be received at the application server, wherein the packet includes an IP address associated with the port forwarding tunnel;

replace the IP address associated with the port forwarding tunnel with the virtual IP address associated with the client host based at least in part on the connection via which the packet is received; and forward the packet to the application server.

17. A non-transitory computer-readable medium storing code, the code comprising instructions executable by a processor to:

receive, at an application server host and via a port forwarding tunnel, a connection request that includes an indication of a client internet protocol (IP) address for a client host;

identify, based at least in part on the client IP address and using a mapping maintained for a plurality of client hosts, a virtual IP address that is assigned to both the client IP address and a client network identifier, wherein the client network identifier is mapped to the port forwarding tunnel from which the connection request is received; and open a connection between an application server hosted by the application server host and the client host using the identified virtual IP address.

18. The non-transitory computer-readable medium of claim 17, wherein the instructions are further executable by the processor to:

receive, at the application server host and via a second port forwarding tunnel, a second connection request that includes an indication of a second client IP address for a second client host, wherein the second client IP address has a same value as the client IP address;

identify, based at least in part on the second client IP address and using the mapping, a second virtual IP address that is assigned to both the second client IP address and a second client network identifier, wherein the client network identifier is mapped to the second port forwarding tunnel from which the connection request is received, wherein the second client network identifier is used to differentiate between the second client IP address and the client IP address that have the same value; and open a second connection between the application server hosted and the second client host using the identified second virtual IP address.

19. The non-transitory computer-readable medium of claim 17, wherein the instructions to receive the connection request are executable by the processor to:

receive the connection request via a tunnel endpoint for the port forwarding tunnel, wherein the tunnel endpoint is provisioned for access by a second plurality of client hosts associated with the client network identifier.

20. The non-transitory computer-readable medium of claim 17, wherein the plurality of client hosts are associated with a plurality of loopback IP addresses in the mapping.

* * * * *